United States Patent [19]

Solow

[11] Patent Number: 4,505,140

[45] Date of Patent: Mar. 19, 1985

[54] AUTOMOBILE SECURITY DEVICE FOR STEERING COLUMN IGNITION LOCKS

[75] Inventor: Joseph E. Solow, Plainview, N.Y.

[73] Assignee: Wolo Manufacturing Corporation, Deer Park, N.Y.

[21] Appl. No.: 415,666

[22] Filed: Sep. 7, 1982

Related U.S. Application Data

[63] Continuation-in-part of Ser. No. 236,878, Feb. 23, 1981.

[51] Int. Cl.³ .................... E05B 17/14; E05B 65/12
[52] U.S. Cl. ........................................ 70/424; 70/18; 70/237
[58] Field of Search ............... 70/18, 19, 237, 211, 70/212, 423, 424, 427, 428, 455, 183, 14, 15, 51, 49, 53–57, 158, 163, 167, 166, 416, 425, 426, 466, DIG. 34, DIG. 43, DIG. 56

[56] References Cited

U.S. PATENT DOCUMENTS

| | | |
|---|---|---|
| 539,650 | 4/1895 | Searle .................................. 70/ |
| 1,341,925 | 6/1920 | Nimmo et al. .................. 70/211 |
| 1,359,213 | 11/1920 | Welch . |
| 1,421,020 | 6/1922 | Miller . |
| 1,428,649 | 9/1922 | Miller . |
| 1,444,161 | 2/1923 | Arnold . |
| 1,681,409 | 8/1928 | Johnson ............................ 70/ |
| 2,166,860 | 7/1939 | Davis ............................. 70/53 |
| 3,808,847 | 5/1974 | Vesely ........................... 70/18 |
| 3,811,303 | 5/1974 | Robertson ......................... 70/ |
| 3,888,096 | 6/1975 | Huss ............................... 70/ |
| 3,913,361 | 10/1975 | Fried ............................. 70/424 |
| 4,008,589 | 2/1977 | Harrell ............................ 70/ |
| 4,019,354 | 4/1977 | O'Dell ............................. 70/ |
| 4,020,662 | 5/1977 | Fowler ............................. 70/ |
| 4,062,193 | 2/1977 | Deleto ............................. 70/ |
| 4,074,550 | 2/1978 | Rowlings .......................... 70/ |
| 4,106,315 | 8/1978 | Dohanyos ......................... 70/56 |
| 4,123,924 | 11/1978 | Dworkis ........................... 70/ |
| 4,282,730 | 8/1981 | Lipschutz ......................... 70/ |
| 4,304,111 | 12/1981 | Nolin .............................. 70/ |

FOREIGN PATENT DOCUMENTS

877220  9/1942  France ................................. 70/53

Primary Examiner—Robert L. Wolfe
Assistant Examiner—Lloyd A. Gall
Attorney, Agent, or Firm—Brumbaugh, Graves, Donohue & Raymond

[57] ABSTRACT

An automobile security device for protecting an ignition lock mounted in an automobile steering column includes a hollow cover to fit over the lock on to the steering column, and a flexible tension-bearing element, preferably a chain, for securing the cover to the column. The element is selectively engaged by a bolt mechanism linearly displaceable by a cam, the cam is turn mounted on and rotatable with the rotatable element of a lock mounted in the cover. Alternatively, a padlock is mounted to the cover such that the padlock housing is disposed on the outside of the cover, and may be unlocked to attach the chain to the padlock shackle.

3 Claims, 5 Drawing Figures

AUTOMOBILE SECURITY DEVICE FOR STEERING COLUMN IGNITION LOCKS

The present application is a continuation-in-part of U.S. application Ser. No. 236,878, filed Feb. 23, 1981.

BACKGROUND OF THE INVENTION

In a typical automobile, the ignition lock is mounted in the steering column below the steering wheel. Ignition locks are subject to defeat by the use of a master key, or by devices which pull the lock, such as a dent puller, to expose the ignition wires.

There is currently sold a steering lock cover which protects the ignition lock from access when the cover is in place. In this known device, an arcuate open collar and hollow cover fit together to form a 360° sleeve around the tubular steering column. The collar and cover pivotally inter-engage at one end, and are selectively secured together at their other end by a lock fixed in the cover. A tongue is fixed on the lock shaft, which is rotatable via a key to rotate the tongue into and out of engagement with a slot cut in the collar portion. The collar is sized for each particular application, i.e. size and shape of steering column, and includes cut-outs and slots, where appropriate, to accommodate turn signal levers and other switches fixed on the steering column. A variation of this device is shown in U.S. Pat. No. 4,020,662 to Fowler.

SUMMARY OF THE INVENTION

The present invention is an improvement in an automobile ignition lock cover, which is universal in application to any size or shape of steering column, and which includes a novel locking device for the cover.

More particularly, the present invention includes a hollow cover adapted to fit over the ignition lock and around a portion of the steering column, and a tension-bearing element, preferably a flexible chain, fixed at one end to the cover. In one embodiment, a cover lock mechanism is mounted in the cover. The rotating element (shaft) of the lock moves, through a cam arrangement, a bolt into and out of engagement selectively with the flexible element to secure the element in position relative to the other end of the cover. Advantageously, the flexible element is a link chain, and the bolt includes one or more projections that selectively engage the chain between consecutive link pins.

An alternative embodiment of the invention has a construction which is especially advantageous from the standpoint of simplicity and cost, but which, as in the case of the first embodiment described above, also possesses the advantages of universal application and improved locking security over the existing device described in the Background section above. In this embodiment, the flexible element is again fixed to one end of the cover. A pair of spaced holes are formed in the opposite end of the cover, into which the shackle of a conventional padlock is fitted. The padlock shackle is secured to the cover such that the lock housing is disposed outside of the cover. By unlocking the padlock, thereby exposing one leg of the shackle, a link of the chain may be attached to the lock to secure the cover to a steering wheel.

For a better understanding of the invention, reference is made to the following detailed description of the preferred embodiments, taken in conjunction with the drawings accompanying the application.

DETAILED DESCRIPTION OF THE PREFERRED EMBODIMENTS

Figure 1:
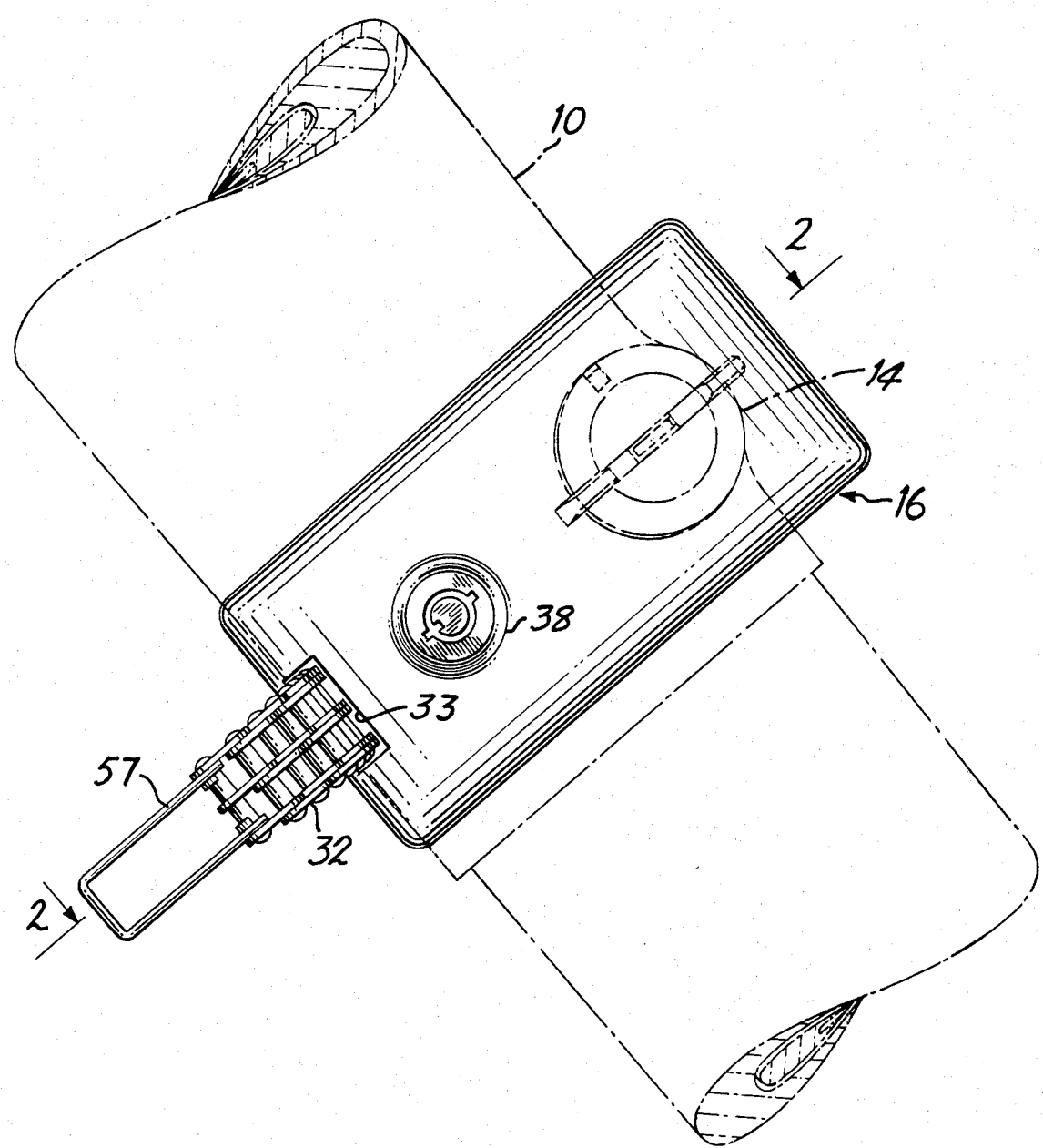
FIG. 1 is a top view of an ignition lock cover in accordance with the invention, shown positioned on an automobile steering column.

For purposes of illustrating the invention, a typical automobile steering column 10 is shown with the embodiment of FIGS. 1-4. The steering column 10 includes a boss 12, in which is positioned an ignition lock 14. In typical automobile applications, the ignition lock also locks the steering column.

Referring to the embodiment of FIGS. 1-4, the ignition lock cover 16 includes two pieces: a hollow cover 18 and a flexible tension-bearing element 20.

The cover 18 is formed with one side open and with a pair of opposed side walls 22, 24 that include arcuate edges 26 adapted to wrap around a portion of the outer cylindrical surface 28 of the steering column 10. An outer wall 27 is arranged perpendicular to the side walls 22, 24, at the edges away from edges 26. The cover 18 also includes opposed top 31 and bottom 30 walls arranged perpendicular to the outer wall 27 and to the side walls 22, 24.

Figure 2:
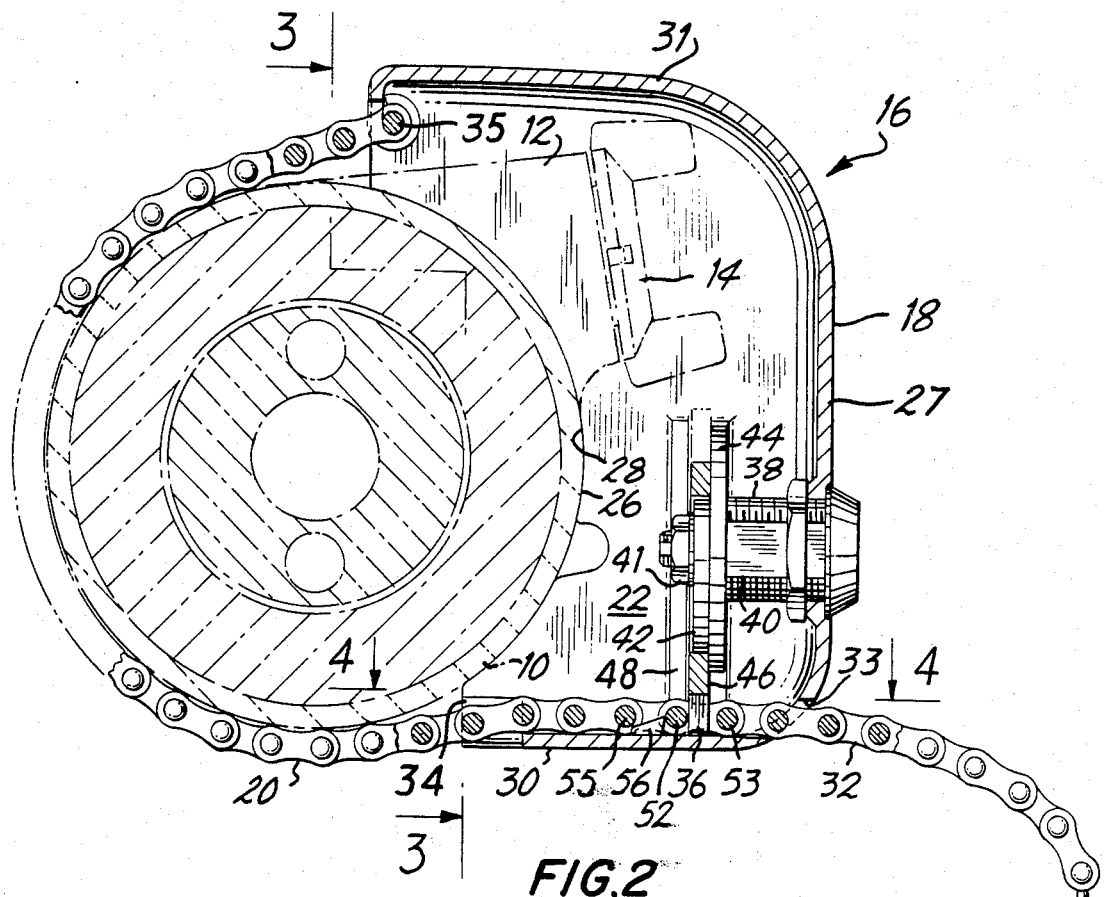
FIG. 2 is a side sectional view of an ignition lock cover in accordance with the invention, taken through lines 2—2 of FIG. 1.

The flexible tension-bearing element 20 is preferably a link chain such as a double strand link chain 32. The chain 32 is fixed at one end, by pivot pin 35, to the cover 18 at the upper wall 31. The arcuate section 26 is formed to space the lower wall 30 from the steering column 10 such that the chain 32 may be inserted into the housing 18 between the lower wall 30 and steering column 10. As shown in FIG. 2, the chain 32 is wrapped around the steering column 10, inserted into the housing portion 18 and locked therein to affix the ignition lock cover 16 to the steering column 10, as described more fully below.

Figure 3:
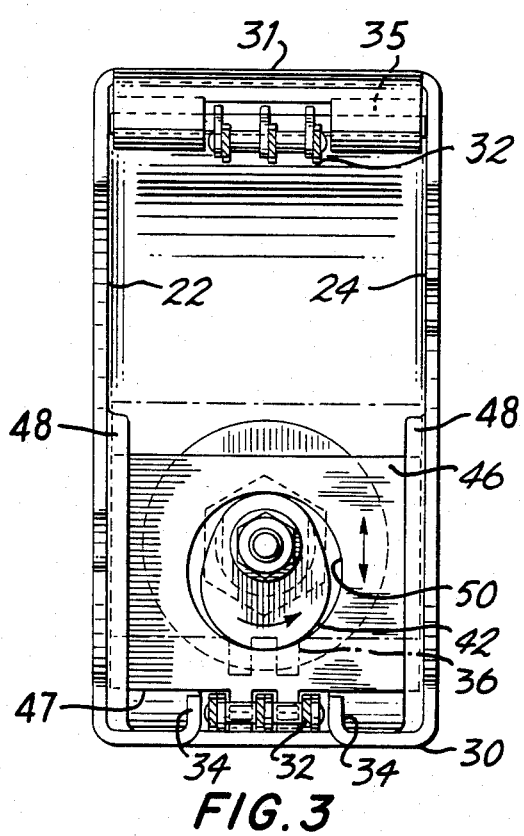
FIG. 3 is an end sectional view of an ignition lock cover in accordance with the invention, taken through lines 3—3 of FIG. 2.
Figure 4:
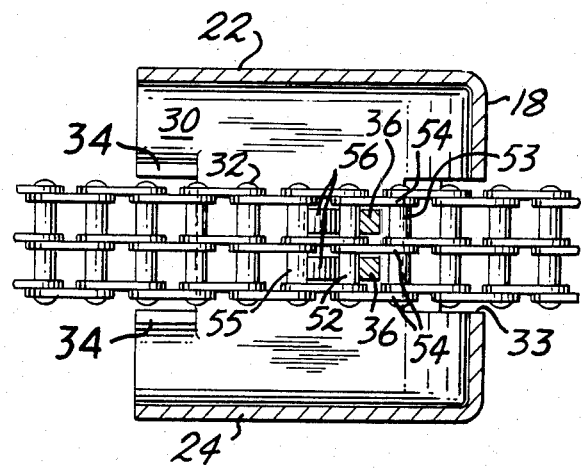
FIG. 4 is a sectional view of a portion of an ignition lock cover in accordance with the invention, taken through lines 4—4 of FIG. 2.

As shown in FIGS. 3 and 4, the bottom wall 30 includes a pair of upturned guides 34 at the open end of the cover 18 to prevent the chain 32 from moving laterally. The bottom wall 30 and outside wall 27 also include a transverse slot 33 so that the chain 32, inserted through the cover 18, may thereafter be pulled taut out of the housing portion 18 through the slot 33.

When inserted into the lower portion of the cover 18, the chain 32 is selectively engaged by a pair of projections 36 on a bolt element 46 moveable up and down by the rotating shaft 40 of a lock 38. A cam 42 is fixed on the rotatable lock shaft 40 by a nut 41, and supported against a circular plate 44 also fixed to the rotatable shaft 40 of the lock 38. The bolt element 46, disposed within the housing cover portion 18, is rectangular in shape and displaceable longitudinally up and down along guides 48 on the side walls 22, 24. The guides 48 prevent rotation of the bolt element 46, and together with the circular plate 44 prevent any movement of the bolt element 46 parallel to the bottom wall 30. Optionally, a washer (not shown) may be positioned between the nut 41 and eccentric 42 to overlie the bolt element 46 to retain the bolt 46 in place.

The bolt element 46 includes an opening 50 therethrough which receives the cam 42. By turning the key in the lock 38, the shaft 40 and thereby the eccentric 42 rotates and displaces the bolt element 46 up or down. As the bolt element moves down, the projections 36 of the bolt element 46 extend through the chain 32 between adjacent link pins 52 and 53, and between links 54, to lock the chain 32 in place. For additional security, a pair of back stops 56 may be affixed to the bottom wall 30, which are positioned between the next adjacent pair of link pins 52 and 55. When the bolt element 46 is moved into the chain engaging position, the chain 32 is constrained by the bottom edge 47 (FIG. 3) of the bolt element 46 from moving up away from the bottom wall 30, and thus is held in engagement with the back stops 56.

When the lock shaft 40 is rotated in the opposite direction, the cam 42 moves the bolt element 46 up out of engagement with the chain 32. Once the projections 36 withdraw from the chain 32, the chain is constrained neither vertically nor longitudinally, and may be moved out of engagement with the stops 56 and removed freely from the cover 18.

In operation, when a vehicle is to be parked the cover 18 is fitted over the ignition lock 14 against the steering column 10. The chain 32 is wrapped around the steering column 10 and inserted into the cover 18 above the bottom wall 30, out through the back opening 33, and pulled taut. To facilitate insertion through the cover 18, a lead 57 made of metal or other relatively stiff material may be attached to the end link of the chain. The lock shaft 40 is rotated to move the bolt element 46 and projections 36 into engagement with the chain, and lock the chain in place. In this position, the ignition lock 14 is protected on all sides from access.

Figure 5:
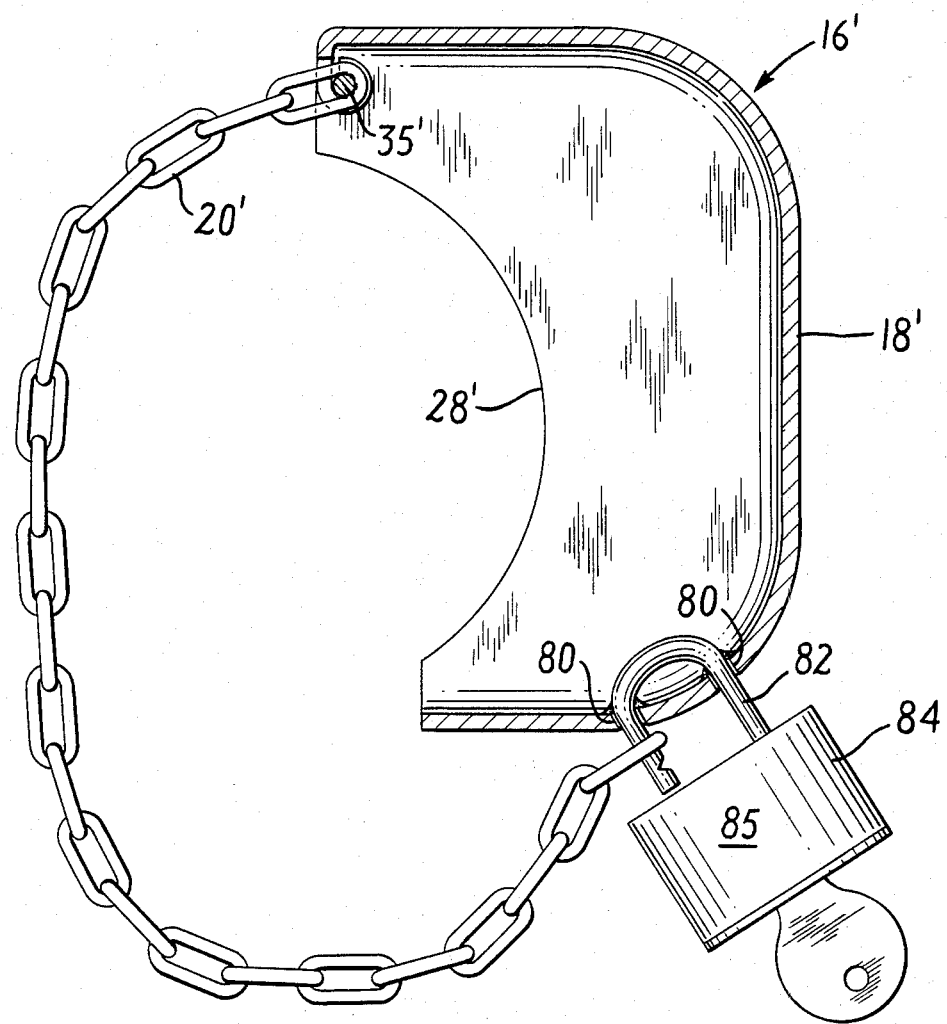
FIG. 5 is a side sectional view of an alternative embodiment of an ignition lock cover in accordance with the invention.

In the FIG. 5 embodiment, the ignition lock cover 16' includes a hollow lock cover 18' and flexible tension-bearing element 20'. The cover 18' is shaped with arcuate surfaces 28', similar to surfaces 26, to fit about a steering column and sized internally to fit over a steering column lock such as lock 14. The chain element 20' is attached to one end of the cover 18', being retained by cross-pin 35'. The anchoring of cross-pin 35' may be similar to that of cross-pin 35.

At the other end of the cover 18', a pair of holes 80 are formed. The shackle 82 of a padlock 84 is fitted through the holes 80, so that the lock housing 85 is disposed outside of the cover 18'. The legs of the shackle 82 are preferably secured by welding in the holes 80 so that the lock 84 is securely mounted on the cover 18'.

In order to mount the ignition lock cover 16', the hollow cover 18' is fitted over the ignition lock, and chain 20' is pulled tight around the steering column. With the padlock 84 unlocked (as shown in FIG. 5), the housing 85 is pivoted to expose the free leg of the shackle, which receives one of the links (not necessarily the end link) of the chain 20'. The padlock 84 is then locked to secure the cover 18' in place.

In view of the flexible tension-bearing element, e.g. chain 32 or 20', the ignition lock cover may be used on a variety of steering columns that differ not only in circumference but in shape. The use of the relatively small-width chain also facilitates attachment to the steering column around turn signal indicators, warning switches, etc. without requiring, as in the case of the device of U.S. Pat. No. 4,020,662, the separate provision of cut-outs or slots. In the FIGS. 1-4 embodiment, the linearly displaced bolt locking mechanism is particularly advantageous in preventing the chain from being pulled out of the lock cover. The locking engagement occurs securely, with relative ease, and at any position in the chain. By providing the additional back stops in the bottom plate of the cover portion, additional locking strength is imparted. At the same time, the use of the back stops will not interfere with removal or insertion of the chain when the bolt mechanism is in the disengaged position. In the FIG. 5 embodiment, positive locking of the free end of the chain is also assured by lock 84.

The foregoing represents a description of the preferred embodiments of the invention. Variations and modifications will be apparent to persons skilled in the art. All such modifications and variations are intended to be within the scope of the invention as defined in the following claims.

I claim:

1. An automobile security device for protecting a steering column ignition lock comprising:
    a cover having a hollow interior space and being open on one side, the open side having arcuate surfaces spacing opposite ends of said cover, thereby being adapted to fit over a portion of a steering column containing an ignition lock;
    a flexible tension bearing element having means to receive the free leg of a shackle element of a padlock for thereby engaging the same;
    means for attaching one end of said element to one end of said cover; and
    a padlock having a housing and a shackle extending from said housing, wherein said shackle is attached to said hollow cover at the opposite end thereof to be partially disposed within said hollow interior space and to extend through said cover to the outside of said hollow interior space for supporting said padlock housing outside of said cover, wherein the padlock may be unlocked to expose a free leg of said shackle outside of said cover, and wherein said padlock is attached to said cover to form a unitary unit such that the cover may be fitted over a steering lock about a steering column and the flexible element may be quickly and easily attached to the exposed, free leg of the shackle of the padlock with the cover in place and resting against the steering column.

2. A security device as defined in claim 1, wherein said tension bearing element is a chain and thereby has means for receiving and engaging the free leg of the shackle at a plurality of positions.

3. A security device as defined in claim 2, wherein said cover has a pair of spaced holes at said opposite end, and wherein portions of said shackle extend through said holes and are secured to said cover.

* * * * *